United States Patent [19]
Huddle

[11] Patent Number: 5,042,156
[45] Date of Patent: Aug. 27, 1991

[54] METHOD AND APPARATUS FOR REDUCING MEASUREMENT ERRORS IN A NAVIGATION TRIAD

[75] Inventor: James R. Huddle, Chatsworth, Calif.

[73] Assignee: Litton Systems, Inc., Beverly Hills, Calif.

[21] Appl. No.: 393,859

[22] Filed: Aug. 11, 1989

Related U.S. Application Data

[63] Continuation-in-part of Ser. No. 145,501, Jan. 19, 1988, abandoned.

[51] Int. Cl.⁵ .......................................... G01C 21/18
[52] U.S. Cl. ..................................................... 33/321
[58] Field of Search ................... 33/318, 320, 321, 322

[56] References Cited

U.S. PATENT DOCUMENTS

| | | | |
|---|---|---|---|
| 3,091,012 | 1/1963 | Gould | 33/321 |
| 3,258,977 | 7/1966 | Hoffman | 33/321 X |
| 3,281,582 | 10/1966 | Fischer | 33/321 X |
| 3,509,765 | 5/1970 | Stevenson, Jr. | |
| 4,017,187 | 4/1977 | Schwartz | |
| 4,179,818 | 12/1979 | Craig | 33/321 |

FOREIGN PATENT DOCUMENTS

| | | | |
|---|---|---|---|
| 109784 | 5/1984 | European Pat. Off. | |
| 1143033 | 2/1969 | United Kingdom | |
| 1394663 | 5/1975 | United Kingdom | 33/321 |

Primary Examiner—Harry N. Haroian
Attorney, Agent, or Firm—Elliott N. Kramsky

[57] ABSTRACT

A navigation method and apparatus for reducing substantially the measurement errors such as accelerometer bias, gyro drift rate, gyro scale factor errors, and gyro sensing axis orientation uncertainty. The navigation apparatus includes a first gimbal for rotating a triad of gyroscopes and accelerometers about a first gimbal axis at a predetermined angular rate. The axis is positioned in a plane whose orientation is fixed in inertial space (as, for example, parallel to the earth's equatorial plane). The direction of rotation about the first gimbal axis is periodically reversed. A second gimbal is provided for rotating the triad of gyroscopes and accelerometers at a predetermined control angular rate. The second gimbal axis is directed along an axis orthogonal to the plane described above whose orientation is fixed in inertial space (as, for example, the earth's polar axis if this plane is parallel to the equatorial plane of the earth). The direction of rotation about the second gimbal axis is periodically reversed.

10 Claims, 2 Drawing Sheets

METHOD AND APPARATUS FOR REDUCING MEASUREMENT ERRORS IN A NAVIGATION TRIAD

This application is a continuation-in-part of application Ser. No. 145,501, filed Jan. 19, 1988 abandoned.

BACKGROUND

1. Field of the Invention

The present invention relates to inertial navigation systems. More particularly, this invention pertains to a method and apparatus for reducing the effects of gyro drift rate, gyro scale factor errors, gyro-sensing orientation uncertainties and accelerometer bias errors for a set of inertial instruments.

2. Description of the Prior Art

Inertial navigation systems are commonly utilized for determining the position of a vehicle relative to a coordinate system that is fixed relative to the earth which in turn rotates with respect to inertial space (the stars) located at a reference point such as the center of the earth. The computed position of the vehicle derived from the inertial instruments (gyros and accelerometers) is normally used to compute commands for controlling the vehicle.

Autonomous inertial navigation systems generally determine the position by means of on-board instruments which measure acceleration and angular rotation rate with respect to inertial space. Such navigation systems are particularly desirable for vehicles such as submarines which remain submerged for extended periods of time. Autonomous inertial navigation systems generally measure acceleration along each of three axes of an orthogonal coordinate system. After an initial alignment, the directions of these axes are determined by measuring their rotation with respect to inertial space by a triad of gyroscopes. The velocity and position of the vehicle are normally determined by transforming the accelerometer measurements to a convenient orthogonal coordinate frame whose axes are related to the earth (e.g., east, north and vertical axes), correcting for Coriolis acceleration components and the force of gravity and integrating once to obtain velocity and again to obtain position, with the aid of a computer.

When a triad (or more) of gyroscopes is rotated with respect to inertial space about a single axis, the gyroscope outputs generally include three kinds of drift errors: gyro drift rate, gyro scale factor error, and gyro misalignment (or sensing axes orientation uncertainty). As a result of such inherent errors, the directions of the measured accelerations, determined from the gyroscope outputs, produce a difference between the navigated and the actual or "true" position of the vehicle. Over the long term, such a difference may increase substantially and can prove to be dramatic.

SUMMARY AND OBJECTS OF THE INVENTION

The foregoing and additional problems and shortcomings of the prior art are addressed and are substantially overcome by the present invention that provides a navigation method and apparatus for reducing substantially the effect of measurement errors due to gyro drift rate, scale factor errors, and the sensing axis orientation uncertainty.

In a first aspect, the invention provides apparatus for reducing navigation measurement errors including gyro drift rate bias, gyro scale factor errors, gyro misalignment errors and accelerometer bias errors in a navigation device of the type that includes a triad of inertial sensors fixed to an instrument block. Such apparatus includes a first gimbal and a second gimbal. The block is engaged to the first gimbal and the first gimbal is engaged to the second gimbal in such a way that the block is rotatable about a first gimbal axis and a second gimbal axis.

Means are provided for reversibly rotating such instrument block through equiangular displacements about the first gimbal axis. Means are additionally provided for reversibly rotating the instrument block through equiangular displacements about a second gimbal axis. The first and second gimbals are arranged so that the first and second gimbal axes are orthogonal.

In a second aspect, the invention provides a method for reducing navigation measurement errors including gyro drift rate bias, gyro scale factor errors, gyro misalignment errors and accelerometer bias errors in a navigation device of the type that includes a triad of inertial sensing devices fixed to an instrument block. Such method includes providing a first and a second gimbal. The block is engaged to the first gimbal and the first gimbal is engaged to the second gimbal so that it is rotatable about a first gimbal axis and a second gimbal axis. The first and second gimbals are arranged so that the first and second gimbal axes are orthogonal.

The instrument block is reversibly rotated through equiangular displacements about the first gimbal axis and is also reversibly rotated through equiangular displacements about the second gimbal axis.

The foregoing and additional advantages and features of the present invention will become apparent from the following detailed description of the invention. In this description, there are utilized numerals that refer to numerals of the drawing figures, like numerals referring to like features throughout the drawings and the description.

DETAILED DESCRIPTION

Figure 1:
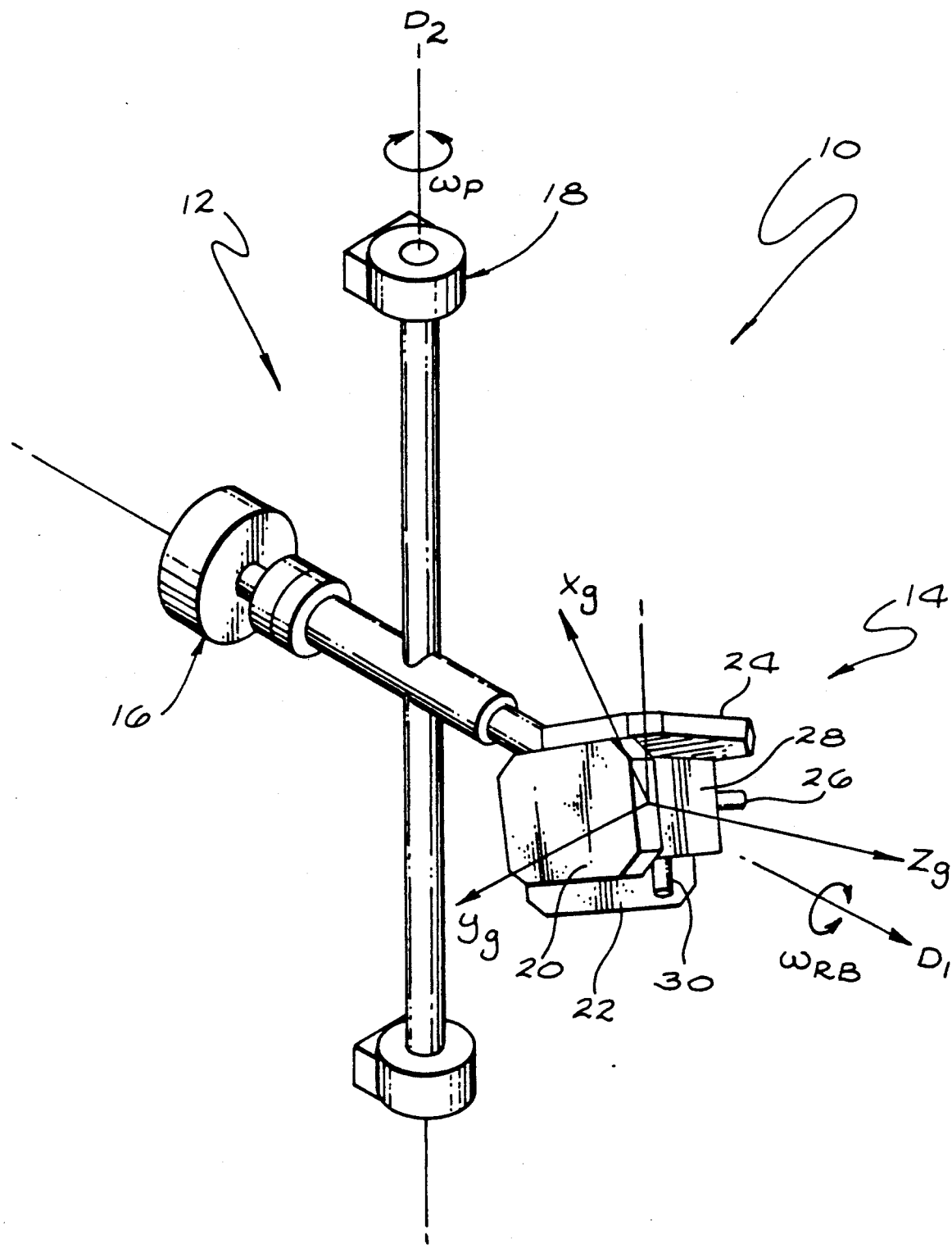
FIG. 1 is a schematic perspective view of an inertial navigation apparatus constructed in accordance with the present invention.

Turning now to the drawings, FIG. 1 is a schematic view of an inertial navigation apparatus 10 incorporating a dual axis arrangement in accordance with the present invention. As will be seen, such an arrangement permits one to reduce errors that otherwise occur in system computed position as a result of gyro drift rate, gyro scale factor error, gyro sensing axis orientation uncertainty and accelerometer bias. The generalized concept of the invention utilizes a dual-axis reversing rate system for manipulating a cluster of inertial instruments 14. The cluster 14 may include three or more gyroscopes and three or more accelerometers. As a consequence of the invention, the gyroscope constant errors of drift rate-bias, scale factor error, and sensing axis orientation uncertainty and accelerometer bias average to zero. Further, time-variation of these same errors produce only a square root of time divergence of navigation error, minimizing the navigated position error for long-term operation.

The arrangement 12 generally comprises a first torquer 16 that drives at an angular rate $\omega_{RB}$, for example a triad of gyros and accelerometers (instrument cluster 14) about the stabilized axis $D_1$ with respect to inertial space. The axis $D_1$ lies in a plane that is fixed with respect to inertial space as for example parallel to the earth's equatorial plane.

A second torquer 18 is arranged to rotate the cluster of gyros and accelerometers 14 at an angular control rate $\omega_p$ about the second axis $D_2$. The second axis $D_2$ is orthogonal to the carousel axis $D_1$ and directed along the earth's polar axis when the plane in which the first axis rotates with respect to inertial space is parallel with the equator. In this instance, the second axis $D_2$ is designated the polar axis.

While the instrument block 14 as illustrated comprises a triad of gyroscopes 20, 22 and 24, and a corresponding triad of accelerometers 26, 28 and 30, the input axes of each of which coincides with a gyroscope input axis, it shall become apparent to those skilled in the art that additional gyroscopes and accelerometers (and other geometries including those in which the accelerometers and gyroscope sensing axes do not coincide) may also comprise the navigation instrument. The measurement errors with such modified navigation apparatus may also be reduced by employing the dual-axis arrangement 12 of the present invention.

Figure 2:
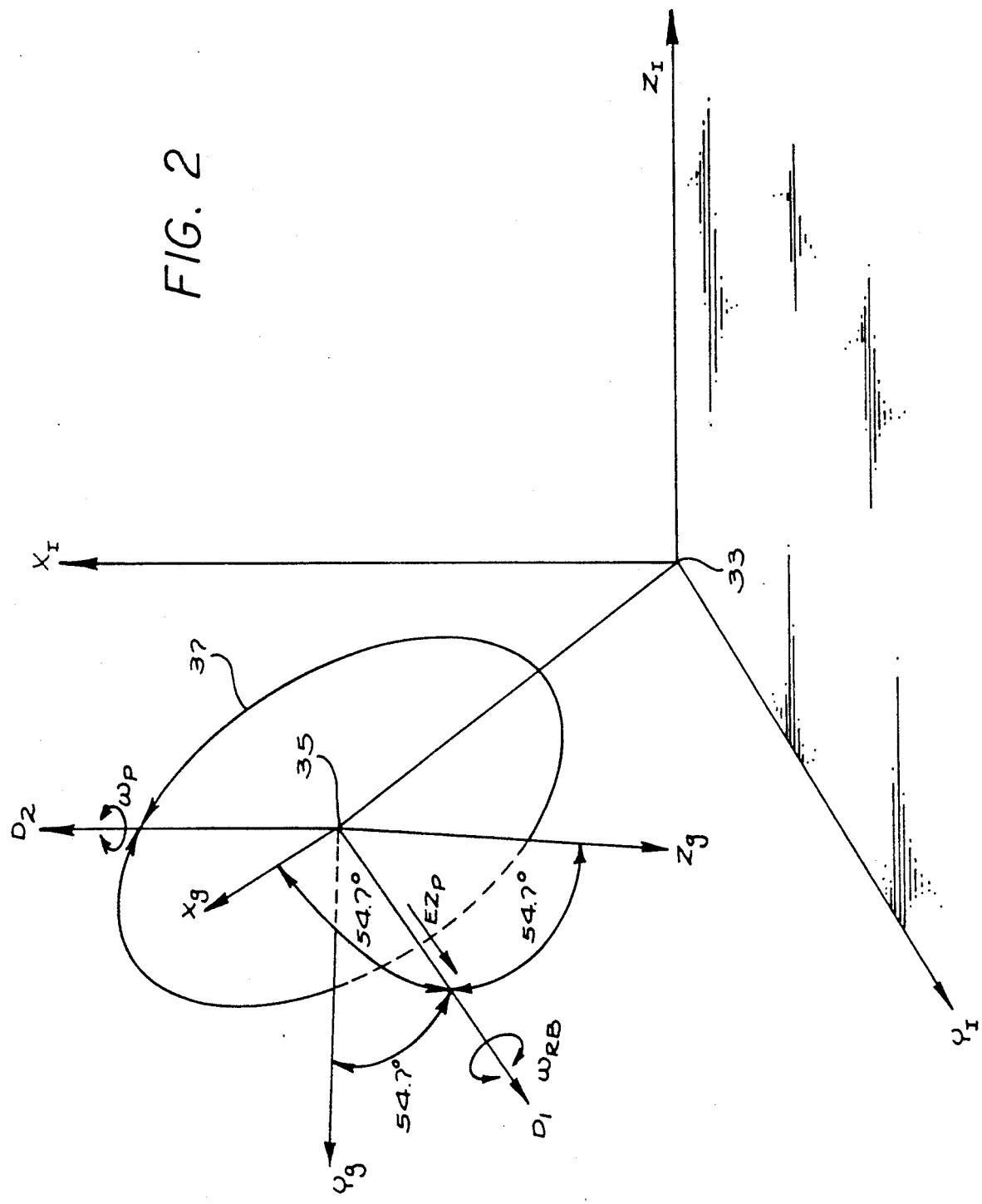
FIG. 2 is a vectorial representation of the operation of the inertial navigation apparatus of FIG. 1.

FIG. 2 is a vectorial representation of the general operation of the inertial navigation apparatus 10 of FIG. 1. A conventional right-handed inertial coordinate system ("I system") has orthogonal $X_I$, $Y_I$ and $Z_I$ axes radiating outwardly from a central reference point 33. Generally an earth-referenced system has the point 33 located at its center, the $X_I$ directed along the earth polar axis, and the $Y_I$ and $Z_I$ axes lying in the earth's equatorial plane.

The gyroscope input or sensing axes of the instrument block 14 are directed along the $X_g$, $Y_g$ and $Z_g$ axes of a three-dimensional orthogonal coordinate system that is centered at a point 35. The first axis $D_1$ in this instance is angularly equidistant at 54.7° from the gyroscope axes $X_g$, $Y_g$ and $Z_g$, and as described above, oriented in a plane parallel to the earth's equatorial plane defined by the $Y_I$ and $Z_I$ axes. The navigation triad 14 is rotated about the first axis $D_1$ at the rate-bias $\omega_{RB}$.

The rotation of navigation triad 14 as above provides a minimum drift rate with respect to the inertial space in the plane 37 that is orthogonal to the axis $D_1$. The projection of the total system gyro drift rate vector onto the plane 37 averages to zero for any constant or slow-changing (relative to the rate of angular rotation $\omega_{RB}$) drift rate of any of the gyroscopes 20, 22 or 24. It should be noted that the rate of angular rotation $\omega_{RB}$ need not be constant or of fixed sign for projection of the gyroscope drift rates onto the plane orthogonal to the axis $D_1$ to average to zero. Nonetheless, the projection of the drift rates of the gyroscopes 20, 22 and 24 onto the first gimbal axis $D_1$, represented by the vector $EZ_p$, does not average to zero.

The long-term position error propagation for an inertial navigation system resulting from the gyro drift rate diverges in proportion to the projection of the total gyro drift rate vector onto the polar axis $X_I$ of the earth multiplied by the time. On the other hand, the projection of the gyro drift rate vector onto the equatorial plane defined by the $Y_I$ and $Z_I$ axes (when the drift rate vector is maintained in a fixed orientation with respect to the rotating earth), causes bounded oscillation of position and azimuth error for a constant drift rate and slowly-divergent position error in proportion to the square root of time for time-variable or noise-like drift rate error. Consequently, system position error propagation is substantially reduced by (1) positioning the first axis $D_1$ in a plane parallel to the earth's equatorial plane and (2) utilizing the first torquer 16 to cause the projection of the total system gyro drift rate vector onto the axis $D_1$ to be maintained nominally in the equatorial plane. Furthermore, when the axis $D_1$ is maintained nominally orthogonal to the earth-fixed east direction in the equatorial plane, azimuth misalignment due to the drift rate vector along the axis $D_1$ is minimized since the projection of the drift rate vector along the axis $D_1$ onto the east axis is minimal or null.

Further, the direction of rotation of the axis $D_1$ is periodically reversed torquer 16 in the invention. Such reversal of direction reduces the drift rate along the first axis $D_1$ due to gyro scale factor error and gyrosensing axis orientation uncertainty. Such reversal also renders the use of slip rings for the first axis $D_1$ unnecessary, thereby enhancing system reliability.

The period of the reversing rotation of the first axis is generally substantially less than the time period over which the scale factor error and the orientation uncertainty may change as a result of environmental factors. Another consideration in determining this period is the desirability of cancelling the drift rate effect due to the scale factor error and orientation uncertainty on one rotation that is induced by the reversed rotation. Consequently, the angular rate $\omega_{RB}$ is periodically reversed by the torquer to reduce the drift rate effects that result from gyro scale factor error and sensing axis orientation uncertainty induced by angular rotation about the first axis $D_1$.

A second rotation is imposed by the second torquer 18 to further reduce the gyro scale factor error and sensing axis orientation uncertainty. Such rotation occurs about the second gimbal axis $D_2$ in such a way that the first axis $D_1$ is, in turn, rotated with respect to inertial space and about the earth's polar axis in this instance. The value of the second rate, $\omega_p$, (also known as the "control rate") is selected in accordance with factors and other considerations discussed below.

It is known that, when the control rate $\omega_p$ is equal and opposite to the earth's rotation, the change in direction of the drift rate error $EZ_p$ along the axis $D_1$ and with respect to the inertial space is zero. Thus, navigation system error will diverge as a function of time. Such a mode of operation is generally referred to as a "space-stable" mechanization. On the other hand, the navigation error due to the drift rate along the axis $D_1$ is reduced when the control rate $\omega_p$ is different from the earth's rotation rate. However, as the control rate $\omega_p$ increases, a significant amount of drift is induced along the second axis $D_2$ (in this instance the earth's polar axis) due to a combination of gyro scale factor error and gyro sensing axis orientation uncertainty introduced by control angular rotation rate $\omega_p$ about the second axis $D_2$.

Such a drift rate produces divergent accumulation of navigation error about the polar axis. In the present invention such undesirable divergent accumulation of navigation error is avoided by periodically reversing the control rate $\omega_p$ so that equal and opposite angular rates of the instrument cluster 14 about the polar axis are realized with respect to inertial space. As a result, the drift rate effect due to the gyro scale factor error and sensing axis orientation uncertainty is substantially reduced.

Thus it is seen that the present invention provides a substantial improvement in the accuracy of inertial navigation systems by employing the foregoing dual-axis rotation technique. In this regard, navigation errors due to constant accelerometer biases, constant gyro drift rates, gyro scale factor errors, and gyro sensing axis orientation uncertainties are bounded to minimal values.

Furthermore, navigation errors due to instabilities in accelerometer biases, gyro drift rates, gyro scale factor errors and gyro sensing axis orientation uncertainties resulting from such effects as operating temperature instability, temperature gradient, stray magnetic fields and vibration are also substantially reduced. In the limit, propagation of navigation error due to such effects could approach the optimal square root of time dependence that is characteristic of gyro drift rate white noise.

While the invention has been described in a preferred embodiment, it must be kept in mind that all other embodiments following within the language of the claims that follow are intended to be included within its scope.

What is claimed is:

1. Apparatus for reducing navigation measurement errors including gyro drift rate bias, gyro scale factor errors, gyro misalignment errors and accelerometer bias errors in a navigation device of the type that includes a triad of inertial sensors fixed to an instrument block comprising, in combination:
   (a) a first gimbal;
   (b) a second gimbal;
   (c) said block being engaged to said first gimbal and said first gimbal being engaged to said second gimbal so that said block is rotatable about a first gimbal axis and a second gimbal axis;
   (d) means for reversibly rotating said instrument block through equiangular displacements about a first gimbal axis;
   (e) means for reversibly rotating said instrument block through equiangular displacements about a second gimbal axis; and
   (f) said first and second gimbals are arranged so that said first and second gimbal axes are orthogonal.

2. Apparatus as defined in claim 1 further characterized in that said first gimbal axis is stabilized with respect to inertial space.

3. Apparatus as defined in claim 2 further characterized in that:
   (a) said first axis lies in the Earth's equatorial plane; and
   (b) said second axis coincides with the Earth's polar axis.

4. Apparatus as defined in claim 3 wherein said equiangular displacements comprise increments of 360 degrees.

5. Apparatus as defined in claim 4 wherein said first axis is oriented in a direction perpendicular to the Earth-fixed east direction in the equatorial plane.

6. A method for reducing navigation measurement errors including gyro drift rate bias, gyro scale factor errors, gyro misalignment errors and accelerometer bias errors in a navigation device of the type that includes a triad of inertial sensing devices fixed to an instrument block comprising the steps of:
   (a) providing a first gimbal; and
   (b) providing a second gimbal; then
   (c) engaging said block to said first gimbal and engaging said first gimbal to said second gimbal so that said block is rotatable about said first gimbal axis and said second gimbal axis; and
   (d) arranging said first and second gimbals so that the axes thereof are orthogonal; then
   (e) reversibly rotating said instrument block through equiangular displacements about said first gimbal axis; and
   (f) reversibly rotating said instrument block through equiangular displacements about said second gimbal axis.

7. A method as defined in claim 6 further including the step of stabilizing said first gimbal axis with respect to inertial space.

8. A method as defined in claim 7 including the additional steps of:
   (a) orienting said first axis in the Earth's equatorial plane; and
   (b) aligning said second axis of rotation with the Earth's polar axis.

9. A method as defined in claim 8 further characterized in that said block is reversibly rotated in increments of 360 degrees about said first and second gimbal axes.

10. A method as defined in claim 9 further including the step of orienting said first axis in a direction perpendicular to the Earth-fixed east direction in the equatorial plane.

* * * * *